US011468111B2

(12) United States Patent
Osotio et al.

(10) Patent No.: US 11,468,111 B2
(45) Date of Patent: Oct. 11, 2022

(54) ONLINE PERSPECTIVE SEARCH FOR 3D COMPONENTS

(71) Applicant: Microsoft Technology Licensing, LLC, Redmond, WA (US)

(72) Inventors: Neal Osotio, Sammamish, WA (US); YoungSun Park, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 208 days.

(21) Appl. No.: 15/169,776

(22) Filed: Jun. 1, 2016

(65) Prior Publication Data
US 2017/0351705 A1 Dec. 7, 2017

(51) Int. Cl.
*G06F 16/248* (2019.01)
*G06F 16/583* (2019.01)
*G06F 16/532* (2019.01)
*G06F 16/9032* (2019.01)

(52) U.S. Cl.
CPC ........ *G06F 16/5838* (2019.01); *G06F 16/248* (2019.01); *G06F 16/532* (2019.01); *G06F 16/9032* (2019.01)

(58) Field of Classification Search
CPC ........... G06F 17/30256; G06F 16/5838; G06F 16/9032; G06F 16/532; G06F 16/248
USPC ........................................................ 707/723
See application file for complete search history.

(56) References Cited

U.S. PATENT DOCUMENTS

| 8,494,215 | B2 | 7/2013 | Kimchi et al. |
| 9,330,127 | B2* | 5/2016 | Steinberg ............ G06F 16/9027 |
| 2004/0249809 | A1* | 12/2004 | Ramani ............. G06F 17/30259 |
| 2005/0108282 | A1* | 5/2005 | Venkatachalam ..... G06F 16/532 |
| 2006/0114252 | A1* | 6/2006 | Ramani ............. G06F 17/30277 |
| | | | 345/419 |

(Continued)

FOREIGN PATENT DOCUMENTS

| CN | 101422352 A | 5/2009 |
| CN | 102956028 A | 3/2013 |

(Continued)

OTHER PUBLICATIONS

"IBM Unleashes QBIC Image-Content Search//Queries Images by Color, Texture, Shape", In Publication of Seybold Report on Desktop Publishing, vol. 9, Issue 1, Jan. 1, 1996, 4 Pages.

(Continued)

*Primary Examiner* — Hicham Skhoun
(74) *Attorney, Agent, or Firm* — Shook, Hardy & Bacon, LLP

(57) ABSTRACT

Techniques for formulating queries and retrieving relevant results for 3D components in a virtual or augmented reality system. In an aspect, a user works with a 3D component using a workflow, and views the 3D component from one or more selected perspective views. Data associated with the workflow and the selected perspective views are transmitted to an online engine. The online engine may include a query formulation module for automatically forming a query based on the received workflow data and selected perspective views. The formulated query may be supplied to a search engine to retrieve online results based on relevance to the formulated queries. One or more most relevant online results may be seamlessly served to the user as part of the workflow.

20 Claims, 10 Drawing Sheets

(56) References Cited

U.S. PATENT DOCUMENTS

| | | | |
|---|---|---|---|
| 2012/0003990 A1 | 1/2012 | Lee et al. | |
| 2012/0110002 A1* | 5/2012 | Giambalvo | G06F 17/30994 707/769 |
| 2012/0188256 A1 | 7/2012 | Lee et al. | |
| 2012/0249591 A1 | 10/2012 | Maciocci et al. | |
| 2013/0097554 A1* | 4/2013 | Wyeld | G06T 19/00 715/782 |
| 2013/0328762 A1 | 12/2013 | McCulloch et al. | |
| 2014/0347391 A1 | 11/2014 | Keane et al. | |
| 2014/0368532 A1 | 12/2014 | Keane et al. | |
| 2015/0016712 A1* | 1/2015 | Rhoads | G06T 17/00 382/154 |
| 2015/0049113 A1* | 2/2015 | Rahman | G06F 16/9554 345/633 |
| 2015/0078667 A1* | 3/2015 | Yun | G06K 9/6201 382/195 |
| 2015/0127650 A1* | 5/2015 | Carlsson | G06F 16/3334 707/737 |
| 2015/0186418 A1* | 7/2015 | Harp | G06F 17/30259 707/723 |
| 2015/0193977 A1 | 7/2015 | Johnson et al. | |
| 2015/0213058 A1* | 7/2015 | Ambardekar | G06F 16/7837 707/706 |
| 2015/0221133 A1* | 8/2015 | Groten | G06T 11/00 345/633 |
| 2015/0347505 A1* | 12/2015 | Ohashi | G06F 16/58 707/754 |
| 2016/0180433 A1* | 6/2016 | Adeyoola | G06F 3/04842 705/26.62 |
| 2016/0232297 A1* | 8/2016 | Puagazhenthi | G06F 16/93 |
| 2018/0158245 A1* | 6/2018 | Govindan | G06F 3/04815 |
| 2019/0018494 A1* | 1/2019 | Gontovnik | G06F 3/011 |
| 2020/0167694 A1* | 5/2020 | Pisner | G06F 9/4881 |
| 2020/0355454 A1* | 11/2020 | Deng | F41A 17/06 |
| 2021/0077047 A1* | 3/2021 | Tolkowsky | A61B 90/39 |

FOREIGN PATENT DOCUMENTS

| | | |
|---|---|---|
| CN | 103339468 A | 10/2013 |
| CN | 104808795 A | 7/2015 |
| CN | 104836998 A | 8/2015 |
| WO | 2005017729 A2 | 2/2005 |
| WO | 2011160076 A2 | 12/2011 |
| WO | 2014204755 A1 | 12/2014 |

OTHER PUBLICATIONS

"International Search Report and Written Opinion Issued in PCT Application No. PCT/US2017/034094", dated Jul. 14, 2017, 11 Pages.

Raskar, et al., "RFIG Lamps: Interacting with a Self-Describing World via Photosensing Wireless Tags and Projectors", In Proceedings of ACM Siggraph, Aug. 8, 2004, 10 pages.

Rodriguez, Salvador, "Google Working On 'Terminator Vision' For Google Glass, Patent Shows Google Working On 'Terminator Vision' For Google Glass, Patent Shows", Published on: Jul. 9, 2015 Available at: http://www.ibtimes.com/google-working-terminator-vision-google-glass-patent-shows-2002051.

Hesameddin, et al., "Fast 3D Object Detection and Pose Estimation for Augmented Reality Systems", In Dissertation of Technical University of Munich, Sep. 2006, 161 pages.

"Office Action Issued in European Application No. 17728717.4", dated Mar. 4, 2020, 5 Pages.

"Summons to attend oral proceedings Issued in European Patent Application No. 17728717.4", Mailed Date: May 25, 2021, 9 Pages.

"Office Action Issued in Chinese Patent Application No. 201780034166.7", dated Mar. 30, 2021, 11 Pages.

* cited by examiner

| Example Formulated Query 531a ~701 | Example Query Results 540a ~751 |
|---|---|
| Image 1: Selected Perspective 150a 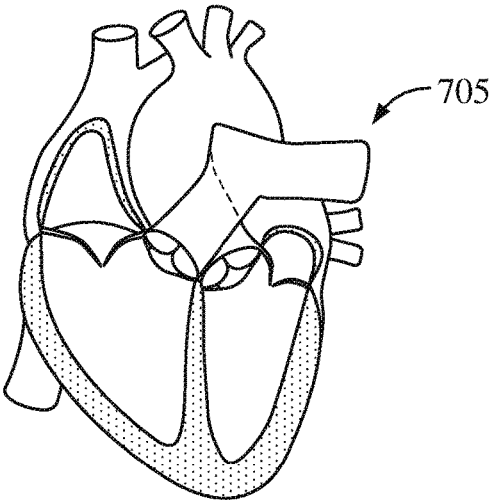 ~705 | Result 1: 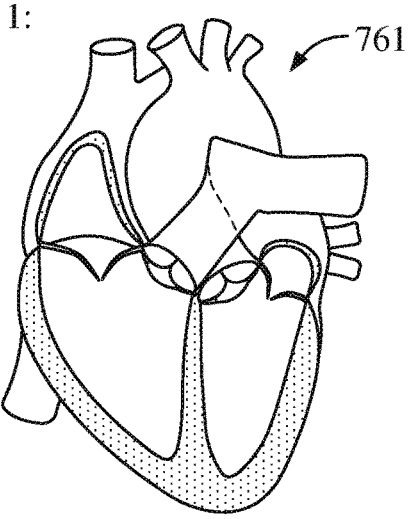 ~761 <br> Description: View of Human Heart Suffering from Aortic Stenosis ~762 |
| Model Data: Human Heart, Male, Age 50... ~711 | Result 2: 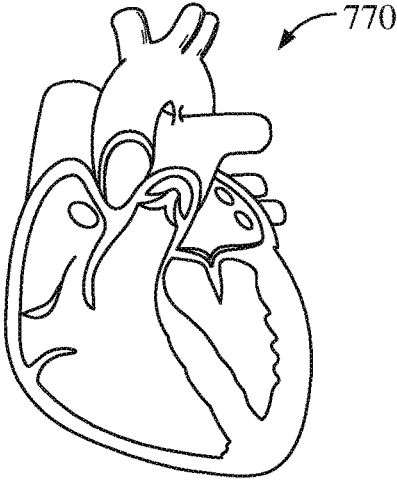 ~770 |
| Perspective Data: Viewing Direction (Azimuth, Inclination, Angle), Magnification Factor... ~712 | |
| User Data: Cardiologist, Hospital Name, Previous Query Search History, Previous Results Clicked... ~713 | |
| Project Data: Recent Edits, Annotations... ~714 | Description: Healthy Adult Human Heart ~771 |

FIG 7

ONLINE PERSPECTIVE SEARCH FOR 3D COMPONENTS

BACKGROUND

With the advent of technology for visualizing and processing information in three dimensions (3D), the use of virtual and augmented reality systems in business, academic, and research settings will be increasingly widespread. Users of such systems may view models of their projects in 3D "virtual" or "augmented" space, e.g., while wearing glasses that stereoscopically display 3D renderings of their models. Users will further be enabled to design and manipulate 3D components in the space using input modalities such as voice and hand gestures.

To facilitate the usability of virtual and augmented reality systems, it would be advantageous to allow users to retrieve information from the Internet in a seamless and intuitive way during their 3D project workflows. For example, when viewing a 3D component from a chosen perspective, a user of a virtual or augmented reality system may desire to retrieve information from an online search engine on what he or she is viewing. It would be desirable to provide a system that can facilitate the retrieval of online information relevant to 3D components such as might be encountered during use of virtual or augmented reality systems.

BRIEF DESCRIPTION OF THE DRAWINGS

FIG. 7 illustrates a correspondence between an exemplary formulated query and exemplary retrieved results.

DETAILED DESCRIPTION

Various aspects of the technology described herein are generally directed towards techniques for processing user queries for information during a workflow for a virtual or augmented reality system, as well as automatically formulating queries based on a user's viewing perspective. Further aspects are directed towards techniques for retrieving results relevant to a formulated query that includes one or more images corresponding to a 2D perspective view of a 3D component.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
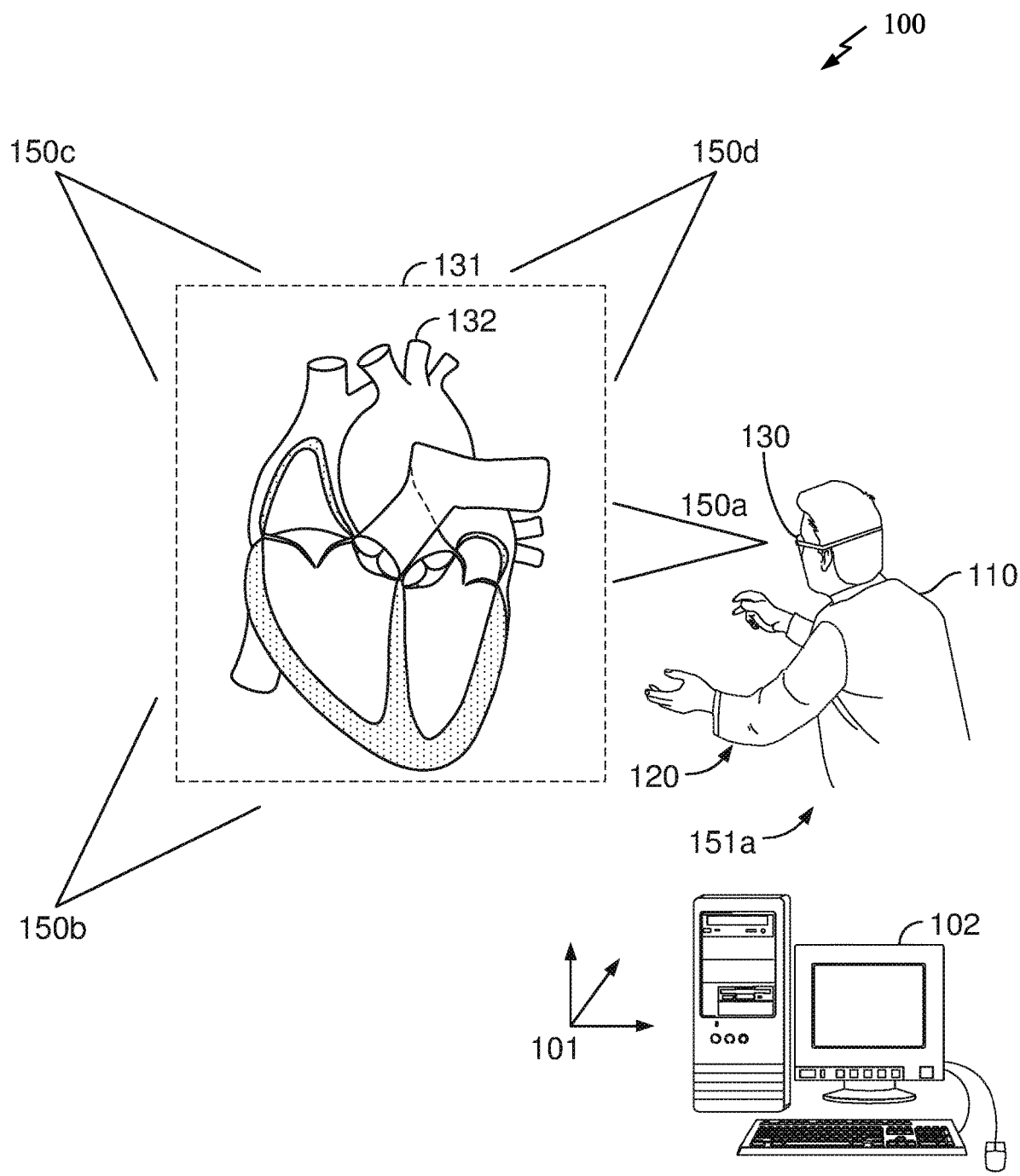
FIG. 1 illustrates a first scenario showing various aspects of the present disclosure.

FIG. 1 illustrates a first scenario 100 showing various aspects of the present disclosure. Note scenario 100 is shown for illustrative purposes only, and is not meant to limit the scope of the present disclosure, e.g., to any particular types of models (e.g., medical, scientific, technical, architectural, fashion, industrial design, etc.) that can be processed, supported modes of input/output interface, specific knowledge areas, search results, or other types of information shown or suggested.

In FIG. 1, system 101 provides a "virtual" or "augmented" reality interface to user 110 to provide an immersive digital experience. In particular, user 110 may wear interactive glasses 130, which presents to user 110 digitally formed imagery 131, also denoted "virtual" or "augmented" imagery. Note imagery 131 shown in FIG. 1 is meant to illustratively suggest what is seen by user 110 through glasses 130, and is not meant to suggest any particular spatial relationship (e.g., size, orientation, directionality, etc.) of imagery 131 to user 110. Imagery 131 may include text, pictures, video, graphics, etc. It will be appreciated that imagery 131 is shown for illustrative purposes only, and is not meant to limit the scope of the present disclosure to any particular types of imagery that can be accommodated by the techniques disclosed herein.

In scenario 100, imagery 131 displayed by glasses 130 may include a digitally formed three-dimensional (3D) model or component 132, corresponding to a project being worked on by user 110. Such a 3D model, and any other aspect of imagery 131, may be presented stereoscopically (i.e., "three-dimensionally" or "in 3D"), e.g., glasses 130 may provide the visual sensation of depth to user 110, by presenting distinct images to the left and right eyes of user 110. In this Specification and in the Claims, a "3D component" may denote parameters associated with any imagery that can be presented stereoscopically.

Further in scenario 100, user 110 may "interact" with certain aspects of imagery 131, e.g., by providing an input through one or more input modalities supported by system 101 to modify imagery 131 and/or any other system parameters. Such input modalities may include, but are not limited to, hand gesture, voice control, eye gaze, etc. In an exemplary embodiment, by moving his hands to produce one or more specific gestures 120 in two or even three dimensions, user 110 may change the way in which component 132 is displayed in imagery 131, e.g., by tilting, zooming, rotating component 132, adding or removing components, or otherwise modifying any aspect of component 132. In an exemplary embodiment, user 110 may also provide speech input to system 101 that may be processed using voice/speech recognition sub-modules (not explicitly shown in FIG. 1). Note the exemplary input modalities are described herein for illustrative purposes only, and are not meant to limit the scope of the present disclosure to any particular types of input modalities that can be processed by a system.

In an exemplary embodiment, computer 102 of system 101 may communicate with glasses 130 (e.g., over wired cables or wirelessly), and required functionality for creating, processing, or modifying imagery 131 may be shared or divided amongst glasses 130, computer 102, and/or other processing modules (not shown). Furthermore, computer 102 or glasses 130 may also be coupled to a plurality of sensors (not shown) for collecting one or more types of input signals provided by user 110. For example, a microphone (not shown) may be provided to receive voice input from user 110, one or more motion/spatial sensors (not shown) may detect and/or interpret hand gestures 120, etc.

In particular, input received through the one or more modalities supported by system 101 may relate to queries by user 110 for certain types of information. For example, in scenario 100, user 110 may be a physician who uses system 101 to visualize and study a 3D component 132 generated from a model of the heart of a human patient, e.g., in preparation for a surgical procedure. In particular, such 3D model may be constructed specifically for a certain patient, e.g., using various measurements, tests, or imaging modalities such as X-ray, magnetic resonance imaging, fluoroscopy, etc. Note while an exemplary embodiment is described herein showing an application of system 101 to the field of health care, the techniques disclosed herein may readily be applied to any other fields that may benefit from 3D visualization (including, but not limited to, e.g., all types of industrial design, scientific research, architecture, engineering, etc.). Such alternative exemplary embodiments are contemplated to be within the scope of the present disclosure.

In an exemplary embodiment, the visual imagery presented by glasses 130 to user 110 depends on a perspective selected by user 110. Based on the selected perspective, glasses 130 may present a different "perspective view" of 3D component 132 to user 110. In an exemplary embodiment, user 110 may select a perspective by directly positioning herself (and hence glasses 130) at a specific position and orientation relative to a fixed spatial reference point (not shown) determined by system 101. For example, a first perspective imagery, e.g., corresponding to a first virtual viewing direction depicted by lines 150a in FIG. 1, may be presented when user 110 is positioned at a first position 151a with a first orientation. Similarly, a second perspective imagery, corresponding to a second virtual viewing direction 150b, may be presented when user 110 is positioned at a second position and orientation (not explicitly labeled in FIG. 1), and likewise for third and fourth virtual viewing directions 150c, 150d.

In an alternative exemplary embodiment, user 110 may alternatively or further select a perspective using other input modalities (e.g., other than positioning and/or orienting his own body relative to a fixed spatial reference point). For example, the perspective may be selected or changed using voice command, cursor input, hand gestures, etc. In such cases, the perspective may nevertheless be associated with a distinct viewing direction such as 150a, 150b, 150c, etc., e.g., heart model 132 may be viewed from a perspective as if user 110 were standing at a spatial position corresponding to viewing direction 150b, etc. Such alternative exemplary embodiments are contemplated to be within the scope of the present disclosure.

In the illustrative scenario wherein 3D component 132 corresponds to a model of a human heart, glasses 130 may present a view of the right frontal surface of the heart to user 110 when viewed from first perspective 150a. Alternatively, glasses 130 may present a view of the left frontal surface of the heart to user 110 when second perspective 150b is selected. In alternative illustrative scenarios (not shown), 3D component 132 may correspond to other types of 3D models, e.g., models of automotive or other industrial designs, chemical, biological, and/or other scientific or other types of models, etc.

In addition to generating views of 3D component 132 from a selected perspective, system 101 may also provide user 110 the capability to connect to a local network or to the World Wide Web while performing manipulations on 3D component 132. User 110 may utilize such connectivity to, e.g., access information from the network or Web while performing a workflow using 3D component 132, which may thereby enhance the productivity of user 110. In particular, when viewing 3D component 132 from various perspectives as described hereinabove, user 110 may have one or more queries regarding the generated views. For example, when viewing the left frontal surface of the heart, user 110 may have a query for additional information regarding a perceived blockage or constriction of some portion of the viewed model.

In an exemplary embodiment, user 110 may verbally articulate such a query, and computer 102 may submit the formulated query to one or more databases located on such network or on the World Wide Web, to retrieve relevant information. In an exemplary embodiment, such databases may correspond to a search engine, e.g., an Internet search engine. Computer 102 may retrieve results from such databases relevant to the user query. For example, responsive to a formulated user query for "left ventricle narrowing," computer 102 may retrieve relevant results and present such results, e.g., text, imagery, or video, etc., within imagery 131. Such information may assist user 110 in better performing his task using system 101.

Figure 2:
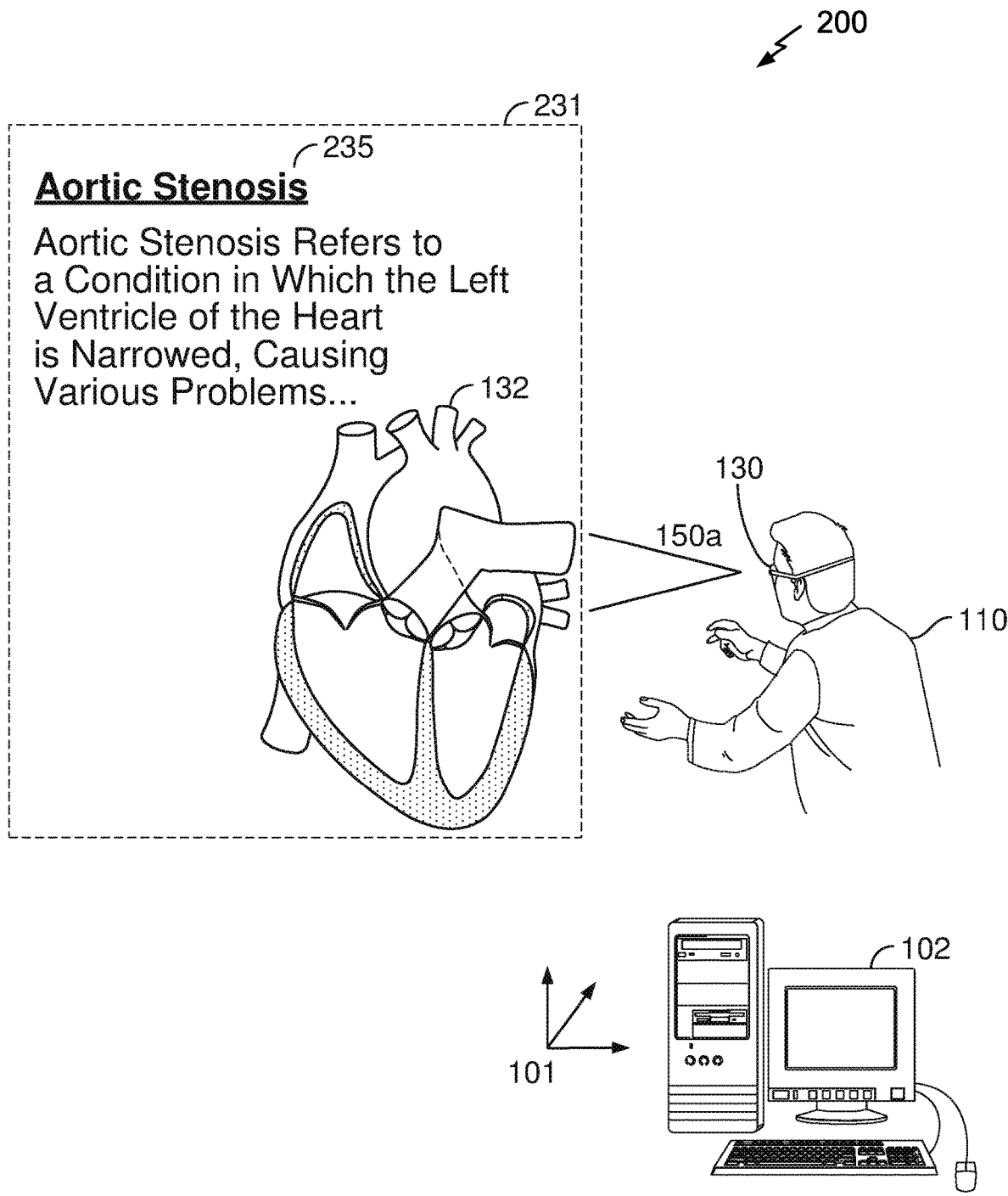
FIG. 2 shows an illustrative scenario wherein results responsive to the exemplary formulated user query are presented next to the 3D component in the imagery.

FIG. 2 shows illustrative scenario 200 wherein results 235 responsive to the exemplary formulated user query are presented next to 3D component 132 in imagery 231.

Figure 3:
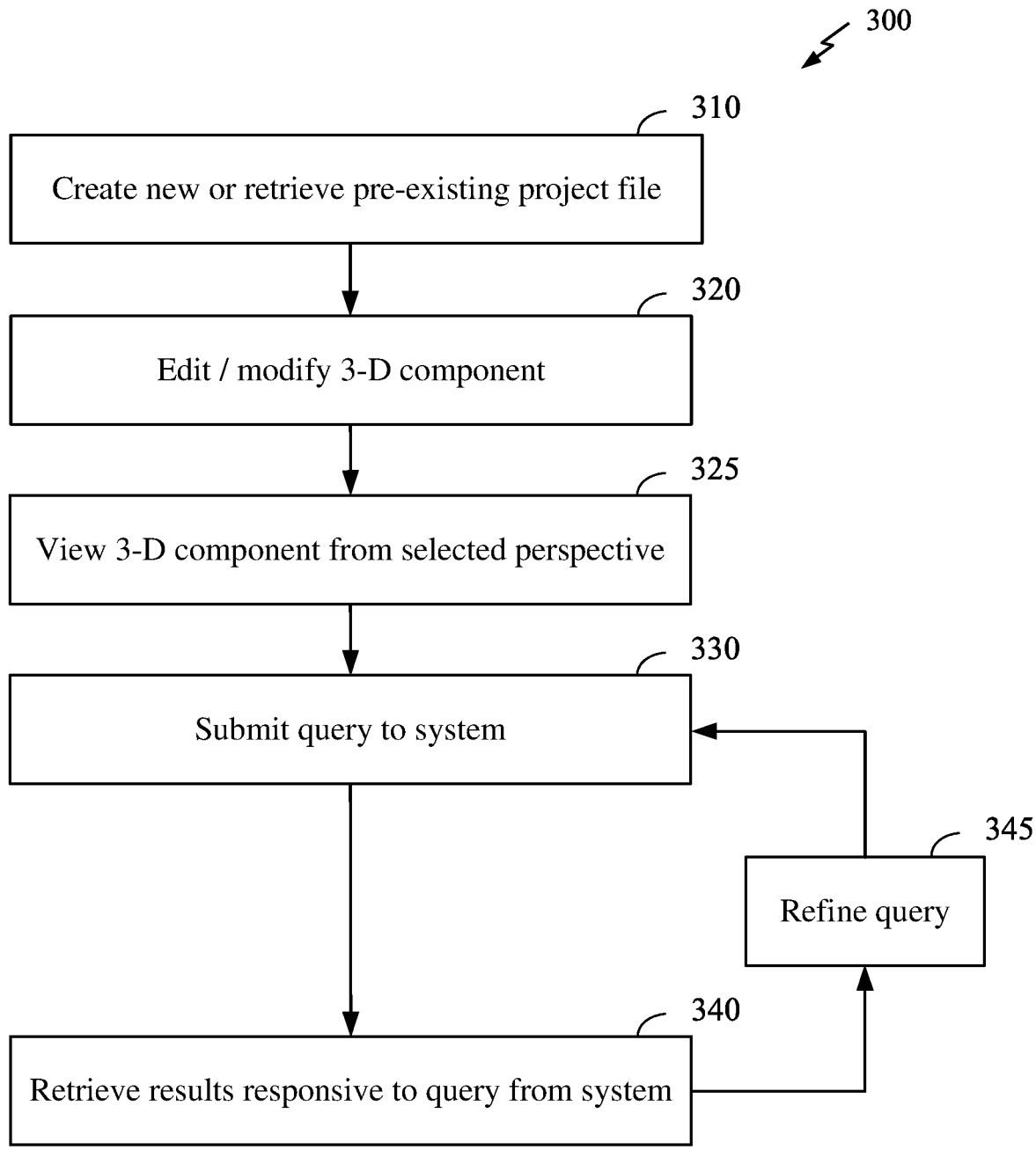
FIG. 3 illustrates an exemplary embodiment of a method for a workflow utilizing a system according to the present disclosure.

FIG. 3 illustrates an exemplary embodiment of a method 300 for a workflow utilizing system 101 according to the present disclosure. Note FIG. 3 is shown for illustrative purposes only, and is not meant to limit the scope of the present disclosure to any particular workflow or sequence utilizing system 101.

In FIG. 3, at block 310, a user may create a new project file, or retrieve a pre-existing one from system 101.

At block 320, a user may edit or modify a 3D component. The 3D component may be stored in the project file. For example, with reference to scenario 100, user 110 may edit 3D component 132 corresponding to a heart model, e.g., to add annotations, etc.

At block 325, a user may view the 3D component from one or more different selected perspectives.

At block 330, a user may submit a query to the system for information. For example, in scenario 100, user 110 may submit a query for "left ventricle narrowing."

At block 340, the user may receive results responsive to the submitted query from the system. For example, in scenario 100, such results may correspond to data 134 retrieved by system 101 responsive to the query for "left ventricle narrowing."

Should the user desire to refine the query based on the retrieved results, the user may formulate a refined query at block 345, and the workflow may return to block 340 to submit the refined query. Otherwise, the user may utilize the information from the retrieved results to continue editing/modifying the project file at block 320.

While system 101 and workflow 300 make it convenient for a user to work with and manipulate 3D components, it would be desirable to equip virtual and augmented reality systems with enhanced capabilities to increase user productivity. In particular, it would be desirable to provide techniques to automatically formulate a query when a given perspective view is selected. For example, with reference to the description of FIG. 2 hereinabove, to formulate a query such as "left ventricle narrowing" when viewing a selected perspective of 3D component 132, user 110 must himself possess the requisite knowledge and experience in cardiac anatomy to accurately identify what is shown in the selected perspective view, to formulate a reasonable query. Similarly, formulating queries for 3D components in other fields, e.g., scientific, medical, other technical fields, etc., may also require an extensive amount of knowledge and experience on the part of the user. In such scenarios, it would be desirable to provide a virtual or augmented reality system having the capability to supplement the knowledge of the user, and/or to automatically formulate queries to retrieve relevant information for given perspective views.

Figure 4:
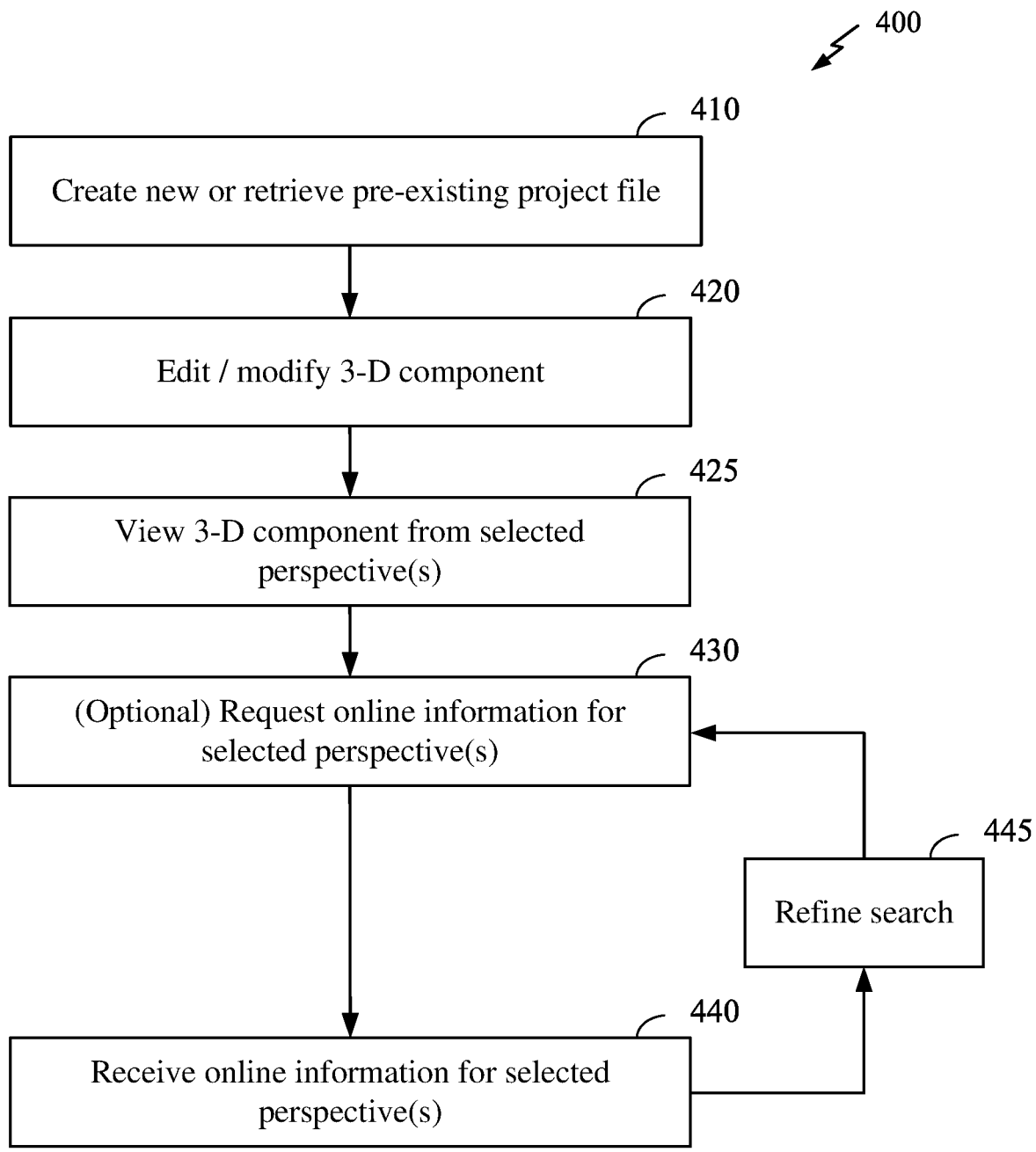
FIG. 4 illustrates an alternative exemplary embodiment of a method for a workflow using a system according to the present disclosure.

FIG. 4 illustrates an alternative exemplary embodiment of a method 400 for a workflow using system 101 according to the present disclosure. Note FIG. 4 is shown for illustrative purposes only, and is not meant to limit the scope of the present disclosure to any particular workflow shown.

In FIG. 4, at block 410, a user may create a new project file, or retrieve a pre-existing one from system 101.

At block 420, a user may edit or modify a 3D component.

At block 425, a user may view the 3D component from one or more different selected perspectives.

At block 430, a user may optionally request online information corresponding to the selected perspective(s). In an exemplary embodiment, system 101 may accept, but need not require, user formulation and submission of an explicit query. At block 430, a user request may provide merely an explicit signal to system 101 to automatically formulate a search query based on the available information (i.e., without requiring the user to explicitly formulate a query, as further discussed hereinbelow), and retrieve results corresponding to such query.

It will further be appreciated that workflow 400 need not receive an explicit request from the user at block 430 to proceed, e.g., from block 425 to block 440. In an exemplary embodiment, the online information at block 440 (described hereinbelow) may be received in response to an automatic formulation and submission of a search query by system 101, e.g., based on edits/modifications performed at block 420, and 3-D perspective(s) of 3D component as viewed at block 425, etc., as further described hereinbelow. Such alternative exemplary embodiments are contemplated to be within the scope of the present disclosure.

At block 440, the user may receive online information relevant to the 3D component and the viewed perspective(s) from the system.

Should the user subsequently desire to submit a different search, the user may refine search parameters, or otherwise indicate to the system that a modified search is to be performed, at block 445, and the workflow may return to block 440. In an exemplary embodiment, refining search parameters may include, e.g., explicitly providing one or more search terms based on the online information already received at block 440, and/or selecting one or more results in the received online information for further investigation, etc.

For example, with reference to illustrative scenario 200 in FIG. 2, data 235 (illustratively referring to "aortic stenosis") may correspond to one or more results retrieved, e.g., at block 440. Note in contrast with workflow 300 in FIG. 3, a user of workflow 400 need not explicitly formulate and submit a query (as required at block 325 in workflow 300), as system 101 may automatically formulate and submit the query based on one or more perspectives from which a 3D component is viewed by the user. Accordingly, block 430 in workflow 400, wherein the user is shown to request online information for the selected perspective(s), is labeled "optional."

According to the present disclosure, various techniques are described for implementing a system having the capabilities described hereinabove. In an exemplary embodiment, the system may automatically formulate and submit queries based on a viewed perspective, and retrieve information relevant to the queries from an online search engine.

Figure 5:
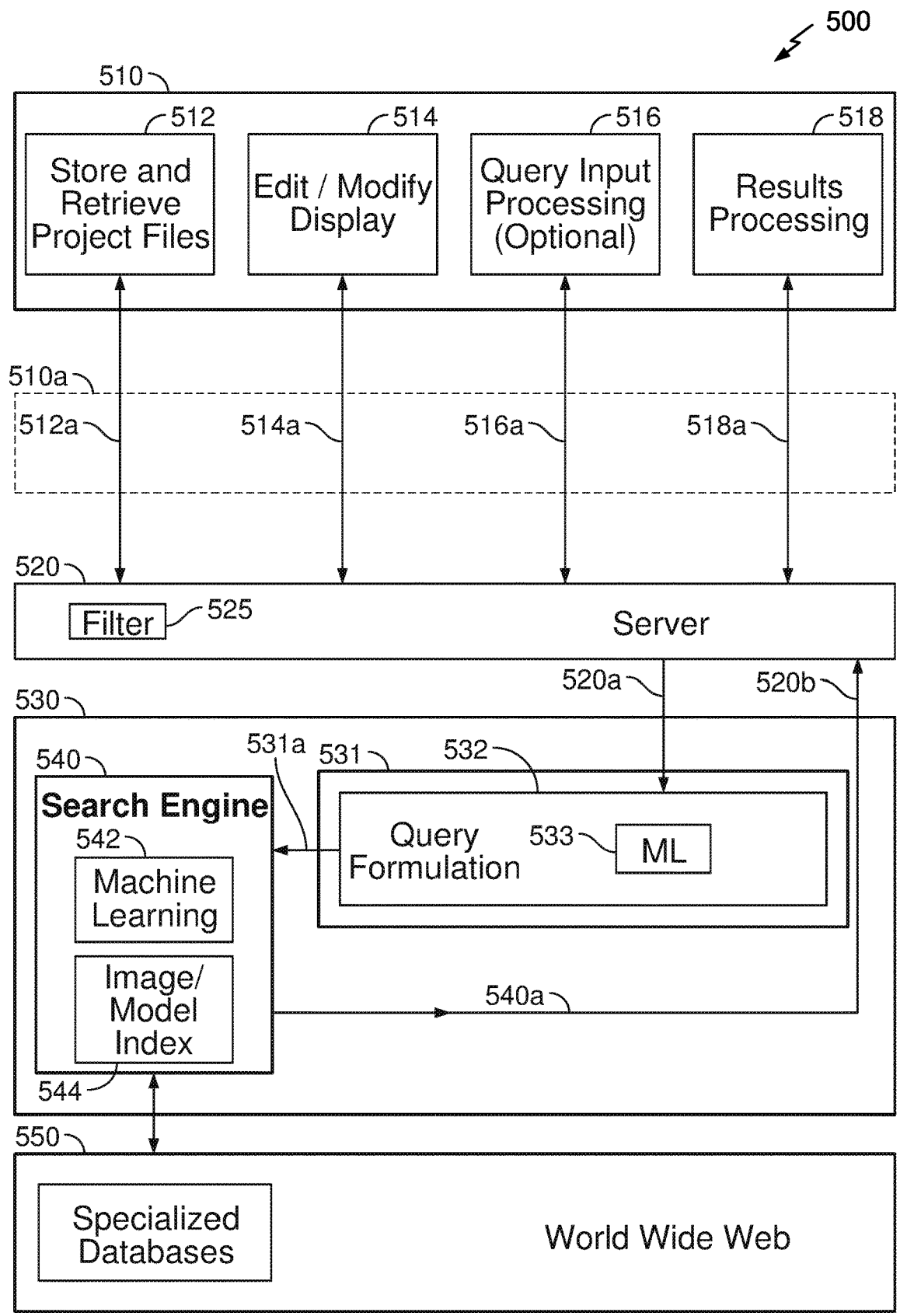
FIG. 5 illustrates an exemplary embodiment of a system for implementing the functionality described herein.

FIG. 5 illustrates an exemplary embodiment 500 of a system for implementing the functionality described hereinabove. Note FIG. 5 is shown for illustrative purposes only, and is not meant to limit the scope of the present disclosure to any particular implementations or functional partitioning of the blocks described. In certain exemplary embodiments, one or more of the functional blocks or module shown, e.g., computer 510 and server 520, may be integrated into a single module; conversely, functionality performed by a single module may be partitioned across multiple modules alternatively from what is shown. Such alternative exemplary embodiments are contemplated to be within the scope of the present disclosure.

In FIG. 5, computer 510 includes a plurality of modules for receiving input from a user, processing 3D components, presenting output to the user, and communicating with other modules of system 500. In particular, computer 510 may include a module 512 for storing and retrieving project files incorporating 3D components. Computer 510 may further include a module 514 allowing editing, modifying, and display of project files, e.g., through glasses 130. Computer 510 may further include an optional module 516 that processes queries, e.g., generated by user 110 and/or computer 101. Computer 510 may further include a module 518 that communicates query-responsive results received from an online engine to the user.

In an exemplary embodiment, computer 510 may be implemented as any type of computer directly accessible by the user, e.g., a desktop computer, laptop computer, smartphone, etc. Computer 510 may include one or more physically conjoint or separate sub-modules for performing any of the functionality described, e.g., 3D glasses such as glasses 130 to display information to the user or other types of image displays. In an exemplary embodiment, glasses 130 may be configured to perform some of the functions of computer 510. In an exemplary embodiment, computer 510 may incorporate computer 102 and/or glasses 130 described with reference to scenario 100 hereinabove.

In an exemplary embodiment, modules 512, 514, 516, 518 of computer 510 may communicate with each other to exchange information and perform operations in sequence or in parallel, such as may be necessary to implement workflow 300 or 400 described hereinabove. For example, module 512 may continuously store (e.g., back up) a project file being edited through module 514, explicit queries may be processed by block 516, query results may be retrieved and processed through module 518 for display by module 514, etc.

Computer 510 communicates with server 520 over a connection 510a, which may be, e.g., a wired, wireless, or any other type of connection. Connection 510a may include several logical channels 512a, 514a, 516a, 518a as described hereinbelow, as well as other logical channels not explicitly shown. In an exemplary embodiment, logical channels 512a, 514a, 516a, 518a may be carried over one or more physical channels.

In an exemplary embodiment, module 512 may store and retrieve project files on server 520 over channel 512a. Module 514 may communicate to server 520 over channel 514a edits and modifications made by the user to project files. For example, modifications made by user 110 to a 3D component of a project file, such as component 132 in scenario 100, may be communicated to server 520 over channel 514a. Such modifications may include, e.g., details such as text edits, shape edits, sequence/order of project files selected and viewed, perspective(s) selected by the user to view a 3D component, etc. In an exemplary embodiment, module 514 may selectively communicate such details over channel 514a, e.g., some details may be omitted, while others may be communicated, according to pre-configured rules.

Optional module 516 may communicate with server 520 over channel 516a. In particular, module 516 may accept queries explicitly formulated by the user, e.g., as described with reference to block 330 of workflow 300, and submit such user-formulated queries to server 520. Alternatively, module 516 may generate a computer-formulated query based on data as collected from workflow 400 (e.g., computer 510 may perform some of the functions described with reference to online engine 530 at block 620 of FIG. 6), and submit such computer-formulated queries to server 520. Module 518 may receive from server 520 over channel 518a results responsive to queries submitted by module 516. In certain exemplary embodiments, module 516 may be omitted, and query formulation may instead be performed entirely at online engine 530, e.g., at block 532 of online engine 530 as further described hereinbelow.

In an exemplary embodiment, queries communicated from module 516 to server 520 may be used to retrieve relevant results either internally or from another online source, e.g., online engine 530 as further described hereinbelow. In such an exemplary embodiment, server 520 may be understood to perform an intermediary function, communicating queries from computer 510 to engine 530, and/or results from engine 530 to computer 510, etc. Other details may also be communicated over one or more channels not shown in connection 510a, including, but not limited to, user identity, frequency or timing of access to the files or the system, etc.

In an exemplary embodiment, computer 510 and server 520 may be "local" or "internal" elements, e.g., they may belong to or be controlled by the user himself, or an entity to which the user also belongs. For example, in an exemplary embodiment wherein the user is a medical professional using workflow 300 or 400 to study a pre-surgical model, computer 510 may be a personal computer used by the user for work purposes, while server 520 may be wholly or in part administered by a hospital to which the user belongs. In an alternative exemplary embodiment wherein the user is an architect using workflow 300 to create an architectural design, computer 510 may be a personal computer used by the user for work purposes, while server 520 may be wholly or in part administered by the architectural firm to which the user belongs. In yet another exemplary embodiment, computer 510 and server 520 may both be implemented on a single personal computer (not shown) used by the user.

In an exemplary embodiment, server 520 need not be implemented in hardware separate from computer 510. For example, filter 525 further described hereinbelow, and/or any other functions performed by server 520, may be physically implemented on the same hardware as used to implement computer 510. Such alternative exemplary embodiments are contemplated to be within the scope of the present disclosure.

Communications between computer 510 and server 520 may be described herein as "local" or "internal." It will be appreciated that in a workflow such as 300, 400, it is sometimes advantageous for the user to access resources that are "remote" or "external," such as an online database, search engine, etc., not under administration of the local entity. Such external resources may be, e.g., more extensive and/or comprehensive than what is available internally.

In FIG. 5, online engine 530 represents such an external resource. Online engine 530 receives input from server 520 over logical channel 520a, and transmit results to server 520 over logical channel 520b. Online engine (or "engine") 530 includes query formulation block 531 coupled to search engine 540. Search engine 540 includes machine learning block 542 and image/model index 544, and other blocks (not explicitly shown in FIG. 5) for performing search engine functionality, as further described hereinbelow.

In particular, query formulation block 531 formulates an explicit query for search engine 540 using input received over channel 520a from online server 520. In an exemplary embodiment, such input received over channel 520a may include selected information received by server 520 from computer 510, e.g., characteristics of project files (e.g., as communicated over channel 512a), characteristics of edits and modifications made to the project files by the user (e.g., as communicated over channel 514a), and pre-existing queries (if available) as formulated by the user or computer (e.g., as communicated over channel 516a). Server 520 may filter such information using filter 525 prior to sending to online engine 530 over channel 520a, as also described further hereinbelow.

In an exemplary embodiment, query formulation block 531 may record information received over channel 520a to assist in assessing and predicting query formulations that will likely be useful to the user of computer 510. In an exemplary embodiment, block 531 may include an optional machine learning module or ML module 533 that learns to map input received over channel 520a to relevant query formulations with increasing accuracy over time. For example, input received over channel 520a may include an accumulating record of all project files created by the user, including project content, project file specifications (e.g., identification of the technical field such as "medicine" or "architecture" relevant to each project file, the identity of the contents of the project file, e.g., "heart model" or "roofing configuration," etc.), edits and modifications made to the project files (e.g., a large number of edits or zoom-ins made to some aspect of the project file, such as zooming in on the left ventricle portion of a heart model), etc. In an exemplary embodiment, online engine 530 may receive such accumulated records from not just one user associated with server 520, but from many users, e.g., each user using his own individual computer (with architecture similar to that shown for computer 510) to work on his own project files. Furthermore, online engine 530 may receive such accumulated records from not just one server 520, but from many servers associated with a variety of organizational entities, e.g., different hospitals, research labs, industrial design firms, etc. Accordingly, ML module 533 incorporated in block 531 may advantageously learn the proper associations between input 520a and formulated queries 531a from training data comprising inputs accumulated across many users, computers (such as 510), and servers (such as 520).

Figure 6:
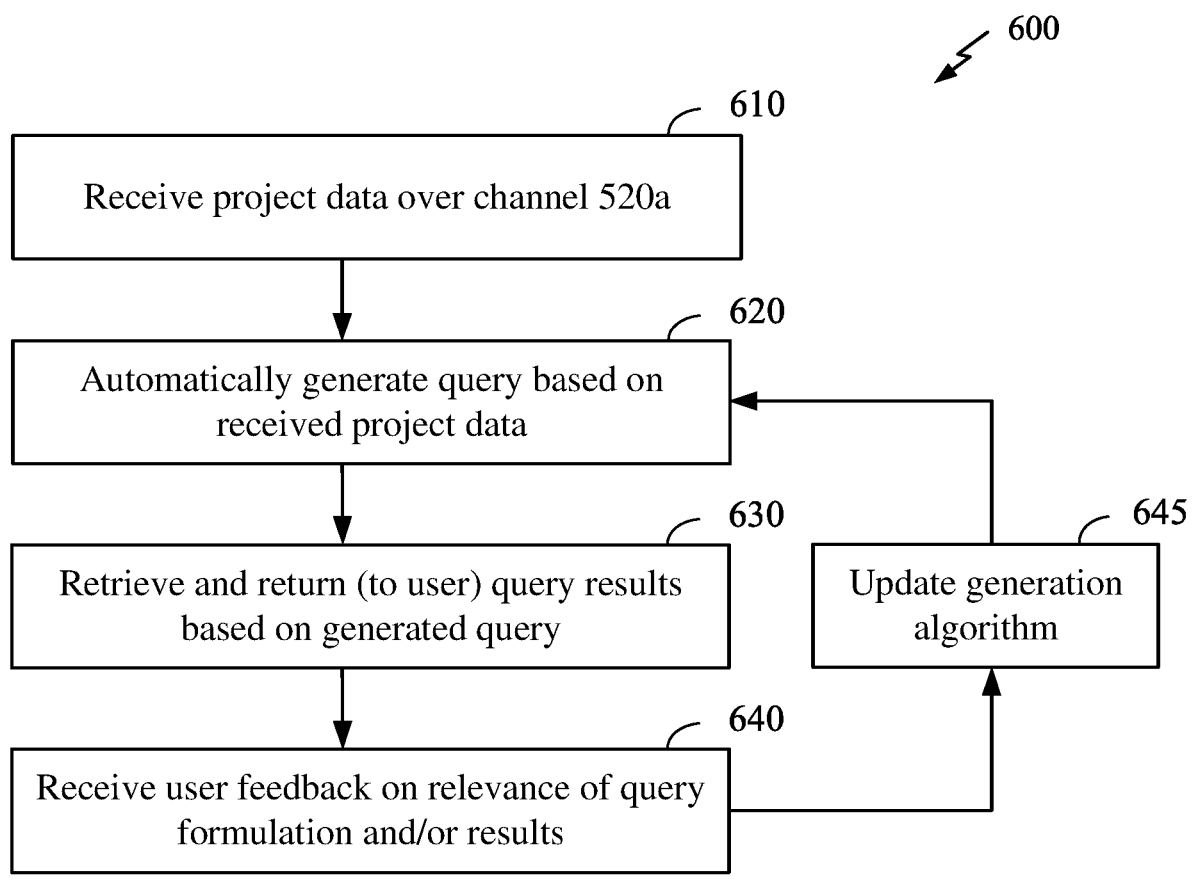
FIG. 6 shows an exemplary embodiment of a method for training optional ML block.

FIG. 6 shows an exemplary embodiment of a method 600 for training optional ML block 533. Note FIG. 6 is shown for illustrative purposes only, and is not meant to limit the scope of the present disclosure to any particular techniques for machine training of ML block 533, or to any particular implementations of query formulation block 531.

In FIG. 6, at block 610, project data is received at ML block 533 over channel 520a.

At block 620, a query is automatically generated based on the received project data. In an exemplary embodiment, such query may be generated as a mapping between the received project data and an output formulated query, wherein the parameters of such mapping may be adjusted or "trained" based on machine learning techniques.

At block 630, based on the generated query, query results are retrieved and returned to the user.

At block 640, user feedback is received regarding relevance of query results. In an exemplary embodiment, such user feedback may include, e.g., an explicit rating of the returned query results by the user. In an alternative exemplary embodiment, formulated query 531a may also be displayed to the user, and rated for relevance and accuracy.

At block 645, the user feedback is used to update the algorithm used to generate the query based on received project data at block 640.

In an exemplary embodiment, project data received over channel 520a may include at least one perspective view of a 3D component associated with one or more project files. For example, referring to scenario 200 in FIG. 2, a view of 3D component 132 associated with perspective 150a may be captured (e.g., as a two-dimensional or 2D image), along with parameters (also denoted herein "perspective data") of perspective 150a itself (e.g., angle of inclination and/or azimuth angle), descriptive data (also denoted herein "model data") on the model (e.g., that the model is of a human heart, from a male patient of age 50, etc.), etc. All such data may be communicated, e.g., over logical channel 512a or 514a to server 520, and from server 520 to query formulation block 531 in online engine 530.

In an exemplary embodiment, the one or more perspective views of the 3D component may be incorporated by query formulation block 531 in formulating query 531a. For example, query 531a may include 2D image(s) corresponding to the one or more perspective views, as well as text descriptors such as perspective data, model data, etc. Further described hereinbelow is a search engine 540 that can accept queries which include not only text strings, but also image data and perspective/model data.

In an exemplary embodiment, user 110 may view 3D component 132 from any or all of a plurality of perspectives 150a, 150b, 150c, 150d, etc. In an exemplary embodiment, all of the plurality of perspectives viewed by user 110 of 3D component 132 may be communicated to server 520 over channel 514a, and accordingly, to online engine 530 over channel 520a.

In an exemplary embodiment, one or more of the viewed perspectives (also denoted herein "selected perspectives") may be specifically designated by user 110 for inclusion in a search query. For example, while viewing 3D component 132 from perspective 150a in scenario 200, user 110 may explicitly designate perspective 150a, and such designation itself may form the basis of a query to be communicated to online engine 530. For example, the designation and perspective view may be captured by block 516, communicated via channel 516a to server 520, and thereafter communicated to online engine 530 over channel 520a. In an exemplary embodiment, the explicit designation of a perspective such as perspective 150a by user 110 may automatically cause block 516 to formulate a query using, e.g., a 2D image corresponding to the selected perspective, as well as perspective data corresponding to the selected perspective. In an exemplary embodiment, user 110 may also input a query string in combination with the selected perspective, to additionally specify the parameters of the query communicated to server 520 over channel 516a. In an alternative exemplary embodiment, the formulated query may include not only the 2D image corresponding to the selected perspective, but also other 2D images previously viewed by the user, along with corresponding model/perspective parameters.

In an alternative exemplary embodiment, user 110 need not explicitly designate a perspective such as perspective 150a to initiate the query generation and/or results retrieval process. For example, based on the data received over channel 520a, possibly including one or more perspectives from which the user views a 3D component, optional machine learning module 533 may "learn" an appropriate trigger point for automatically formulating a machine-generated query 531a based on the accumulated data received. For example, if user 110 in scenario 200 at any point views 3D component 132 using a zoom-in factor of 10× or greater, then machine learning module 533 may recognize that such a zoom-in factor likely corresponds to user 110 needing additional information regarding the viewed image, and may thus automatically initiate a query formulation process using the available data received over channel 520a. Alternatively, machine learning module 533 may learn to automatically associate previously viewed perspectives with automatic query formulation, and/or automatically trigger query formulation and submission based on specific types of perspective views received. For example, module 533 may learn to identify an anomalous condition such as "aortic stenosis" from a multitude of previously viewed perspectives across multiple users, and thus automatic query formulation may be initiated when such a perspective view is detected when receiving workflow data over channel 520a. Such alternative exemplary embodiments are contemplated to be within the scope of the present disclosure.

In an alternative exemplary embodiment, ML block 533 may be optional, and query formulation block 531 may instead formulate query 531a using a set of preconfigured rules. For example, block 531 may be configured to generate a query using any explicitly formulated query from the user 110, e.g., as received by block 516 and communicated over channel 516a, as well as one or more selected perspectives of a 3D component, if available. Alternatively, if the user does not explicitly formulate a query, then the user may simply designate a perspective of a 3D component, which designation will automatically trigger query formulation block 531 to formulate a query based on the selected perspective, perspective data, project data, etc. Alternatively, if the user does not explicitly select a perspective of 3D component for query, block 531 may nevertheless be configured to automatically initiate query formulation in response to certain pre-configured conditions, e.g., when a certain zoom factor is applied, in combination with a minimum "dwelling" time (e.g., time spent by a user viewing a model from a certain perspective without performing other tasks), etc. Such alternative exemplary embodiments are contemplated to be within the scope of the present disclosure.

Formulated query 531a is submitted to search engine 540, which retrieves relevant results 540a responsive to query 531a. Results 540a may subsequently be communicated by online engine 530 back to server 520 over logical channel 520b, and server 520 may then convey the results back to computer 510 for display to the user.

In an exemplary embodiment, search engine 540 may include a machine learning module 542 that learns to map queries 531a to relevant results with increasing accuracy over time. Module 532 may employ techniques derived from machine learning, e.g., neural networks, logistic regression, decision trees, etc. In an exemplary embodiment, channel 520a may convey certain training information from server 520 to engine 530 that is useful to train machine learning module 542 of search engine 540. For example, a user identity of a user of computer 510 may be conveyed to machine learning module 542 over channel 520a. Certain contents or characteristics of project files, e.g., as received from module 512 over channel 512a, as well as certain edits and modifications of project files, e.g., as received from module 514 over channel 514a, may also be conveyed to module 542 over channel 520a. Such received data may be utilized by online engine 530 to train machine learning module 542 to better process and serve queries 531a.

As an illustrative example, user 110 in scenario 200 may have a corresponding user identity, e.g., associated with user alias "anne123." anne123 may participate in editing multiple medical project files, e.g., CardiacModel1 associated with a heart model for a first patient, and CoronaryArteryFile1 associated with a coronary artery model for the first patient, etc. Edits made to such project files may include, e.g., annotating some portion of CardiacModel1 with some diagnostic or explanatory remark such as "possible artery constriction," etc. Assuming such information is made available to train machine learning module 542 of search engine 540, e.g., over channel 520a, search engine 540 may advantageously serve more relevant and accurate results to submitted queries.

For example, in response to a query submitted by anne123 which includes a 2D image (e.g., selected perspective) of a side view of the heart, search engine 540 may rank certain search results relating to artery constriction more highly based on the annotation mentioned hereinabove, etc. Note the preceding discussion is provided for illustrative purposes only, and is not meant to limit the scope of the present disclosure to any particular types of information or techniques for processing and/or determining patterns in such information that may be employed by machine learning module 542.

In an exemplary embodiment, server 520 may perform certain processing on data received from computer 510, e.g., over connection 510a, prior to conveying such data to online engine 530. In particular, as server 520 and computer 510 may be internal elements, e.g., under the administration of the same entity to which the user belongs, while online engine 530 may be an external element, it may be desirable in certain cases for server 520 to remove certain sensitive or confidential information prior to sending data over channel 520a to engine 530. In an exemplary embodiment, such functionality may be performed by a filter 525 on server 520.

In an exemplary embodiment wherein query 531a includes 2D image(s) corresponding to one or more perspective views of a 3D component, search engine 540 may be configured to accept queries containing such image(s) as input fields. In particular, search engine 540 may be configured to retrieve and rank online results based on similarity or correspondence of the online results to one or more images. In an exemplary embodiment, relevance of a query image (corresponding to, e.g., a perspective of a 3D component) to an online image may be at least in part determined based on image pattern recognition and matching techniques, and may take advantage of techniques known in the arts of computer vision, machine vision, image and pattern recognition, etc. For example, one or more correlation metrics between a query image and a candidate image may be calculated. In an exemplary embodiment, such calculations may be additionally informed by knowledge of other parameters, such as viewing perspective, etc.

FIG. 7 illustrates a correspondence between an exemplary formulated query 531a and exemplary retrieved results 540a. Note FIG. 7 is shown for illustrative purposes only, and is not meant to limit the scope of the present disclosure to any particular types of 3D components, technical fields, query formulations, query fields, lengths or sizes of formulated queries, number or types of results, etc.

An example formulated query 531a including several fields is shown on left-hand side 701 of FIG. 7. In particular, the example formulated query 531a includes an image field 705, corresponding to, e.g., one or more perspective views of the 3D component as received over channel 520a. Query 531a further includes model data field 711, specifying various parameters of the model used to generate the perspective view(s) shown in image field 705. Query 531a further includes perspective data 712, specifying various parameters related to the perspective from which the 3D component was viewed. For example, such perspective field may specify the parameters of perspective 150a illustrated in scenarios 100, 200, or any other perspective from which a 3D component may be viewed. Query 531a further includes user data field 713, specifying various characteristics of the user using system 101 to generate the selected perspective view. Query 531a further includes project data field 714, specifying parameters associated with a project file with which the viewed 3D component is associated.

Note the example formulated query 531a in FIG. 7 is shown for illustrative purposes only. Any of the query fields shown may be omitted from any particular search query or any exemplary embodiment, depending on the particular configuration of the system. Furthermore, additional query fields not shown may readily be included in any particular search query or any exemplary embodiment, and may be readily accommodated using the techniques of the present disclosure. Such alternative exemplary embodiments are contemplated to be within the scope of the present disclosure.

Example query results 540a are shown on right-hand side 751 of FIG. 7. In particular, a first result ("Result 1") illustratively includes an image portion 761 and a text description 762 describing image portion 761, and likewise for second result ("Result 2") with image portion 770 and text description 771, etc. In an exemplary embodiment, Results 1 and 2 may be retrieved from, e.g., an online (e.g., Web or Internet) source of images/models with corresponding descriptions. In an exemplary embodiment, Results 1 and 2 may be retrieved from different online sources.

Returning to FIG. 5, to facilitate the identifying and matching submitted query image with relevant online results, search engine 540 may maintain image/model index 544. Index 544 may include, e.g., a listing of online-accessible models and images that are deemed relevant and/or useful in satisfying search queries containing images, and particularly, 2D images generated from 3D components, wherein the perspective(s) used to generate the 2D images may or may not be known a priori.

Figure 8:
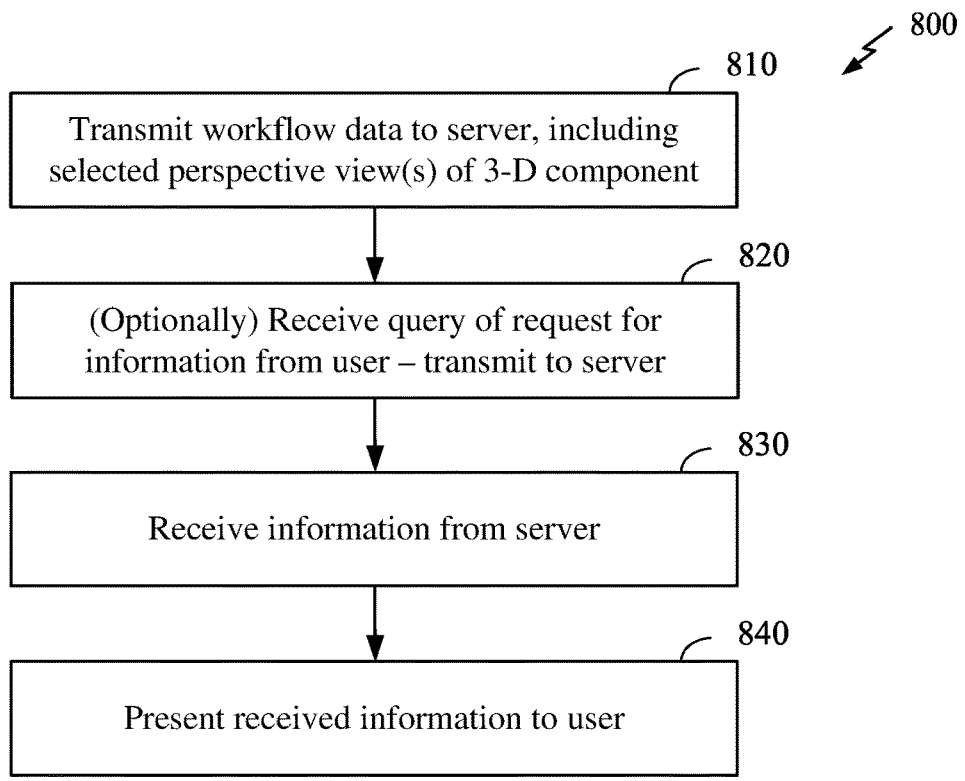
FIG. 8 illustrates an exemplary embodiment of a method executed by a computer during a workflow, described with reference to a system.

FIG. 8 illustrates an exemplary embodiment of a method 800 executed by computer 510 during workflow 300, described with reference to system 101. Note FIG. 8 is shown for illustrative purposes only, and is not meant to limit the scope of the present disclosure to any particular method shown. Note computer 510 may generally perform a diverse array of functions, only some of which are explicitly described in method 800 for clarity.

In FIG. 8, at block 810, computer 510 transmits workflow data to server 520. In an exemplary embodiment, workflow data may include any data relating to workflow 300 or 400, including, but not limited to, data communicated over channels 512a, 514a described hereinabove.

At block 820, computer 510 optionally receives an explicit query or request for information from the user. In such cases, computer 510 may transmit the query or request for information to server 520.

At block 830, computer 510 receives information from server 520. Such information may include, e.g., query results, wherein such query results may be responsive to queries explicitly formulated by the user, or such query results may be responsive to queries automatically generated by online engine 530, etc.

At block 840, information received at block 830 is provided to the user through a user interface.

Figure 9:
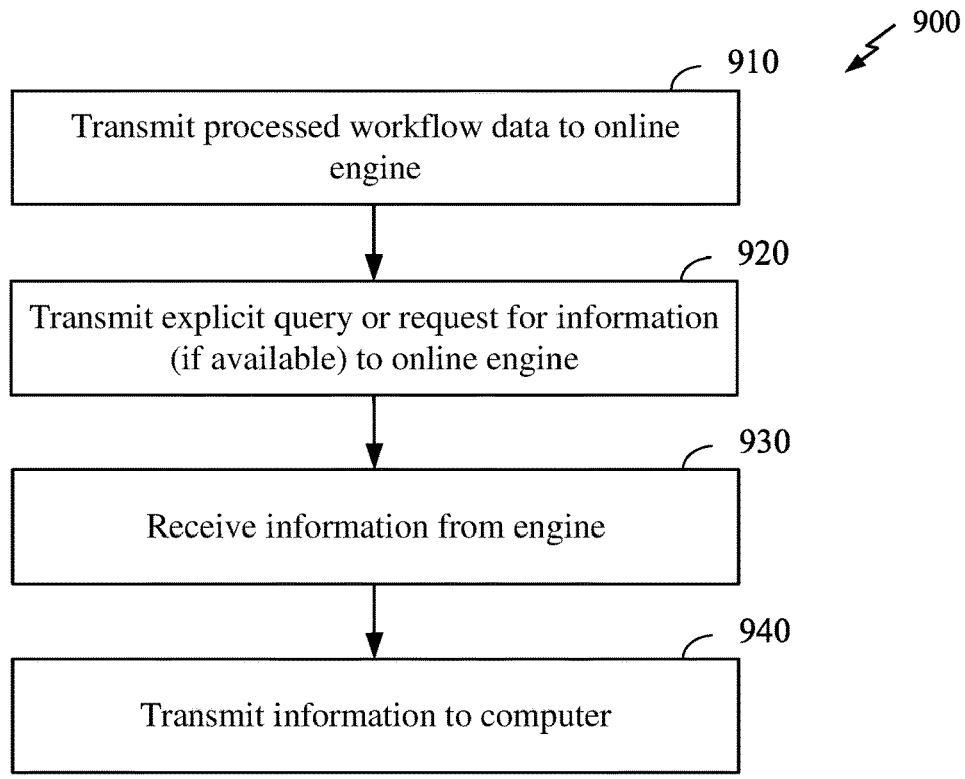
FIG. 9 illustrates an exemplary embodiment of a method executed by a server during a workflow.

FIG. 9 illustrates an exemplary embodiment of a method 900 executed by server 520 during workflow 400. Note FIG. 9 is shown for illustrative purposes only, and is not meant to limit the scope of the present disclosure to any particular method shown. Note server 920 may generally perform a diverse array of functions, only some of which are explicitly described in method 900 for clarity.

In FIG. 9, at block 910, server 520 transmits processed workflow data to online engine 530. At block 920, a user-generated "explicit" query or request for information (if available) is transmitted to online engine 530. At block 930, information is received from engine 530. At block 940, the received information is transmitted to computer 510.

Figure 10:
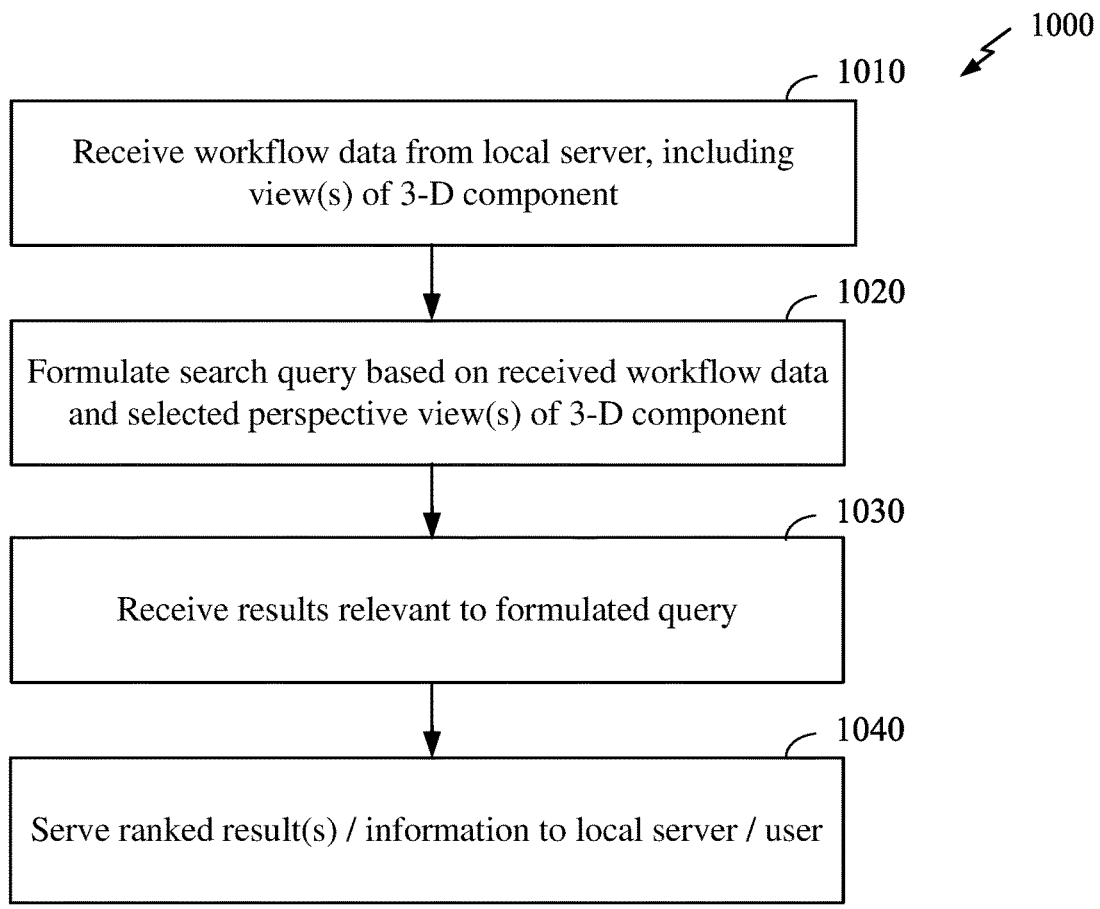
FIG. 10 illustrates an exemplary embodiment of a method executed by an online engine during a workflow.

FIG. 10 illustrates an exemplary embodiment of a method 1000 executed by online engine 530 during workflow 400. Note FIG. 10 is shown for illustrative purposes only, and is not meant to limit the scope of the present disclosure to any particular method shown. Note engine 530 may generally perform a diverse array of functions, only some of which are explicitly described in method 1000 for clarity.

In FIG. 10, at block 1010, engine 530 receives workflow data from a local server, e.g., server 520. In an exemplary embodiment, such workflow data may include one or more selected perspective views of a 3D component.

At block 1020, engine 530 formulates a search query based on received workflow data and the selected perspective view(s) of the 3D component.

At block 1030, results relevant to the formulated query are retrieved. The retrieved results may be processed, e.g., ranked or otherwise filtered for relevance. It will be appreciated that such processing may utilize workflow data received, e.g., over channel 520a, to refine and increase the relevance of results presented to the user.

At block 1040, the retrieved results may be served to the server 520 and the user.

Figure 11:
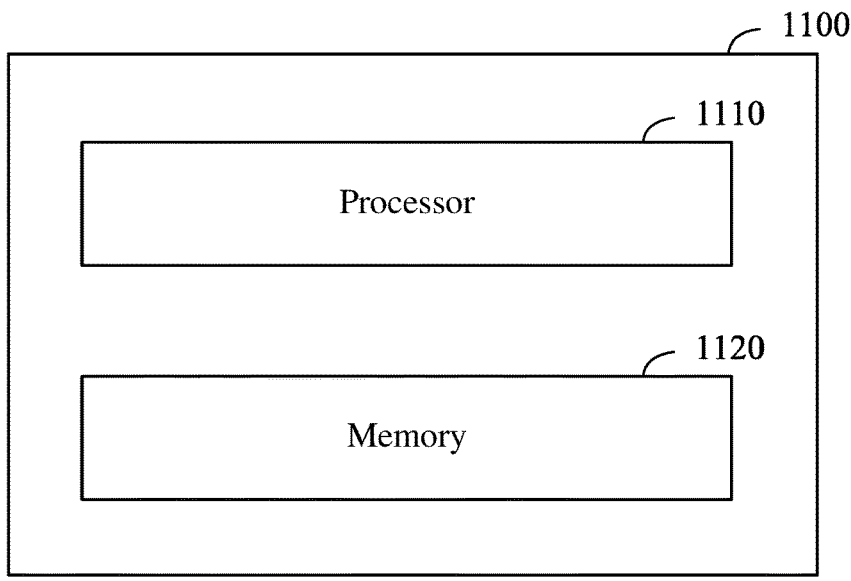
FIG. 11 illustrates an exemplary embodiment of an apparatus according to the present disclosure.

FIG. 11 illustrates an exemplary embodiment of a computing device 1100. Device 1100 includes a processor 1110 and a memory 1120 holding instructions executable by the processor 1110 to: receive workflow data generated by a user; formulate a query based on the received workflow data, the query comprising a query image; retrieve a plurality of online results relevant to the formulated query; rank the retrieved plurality of online results according to relevance to the formulated query; and serve at least one most highly ranked of the ranked plurality of results to the user.

Figure 12:
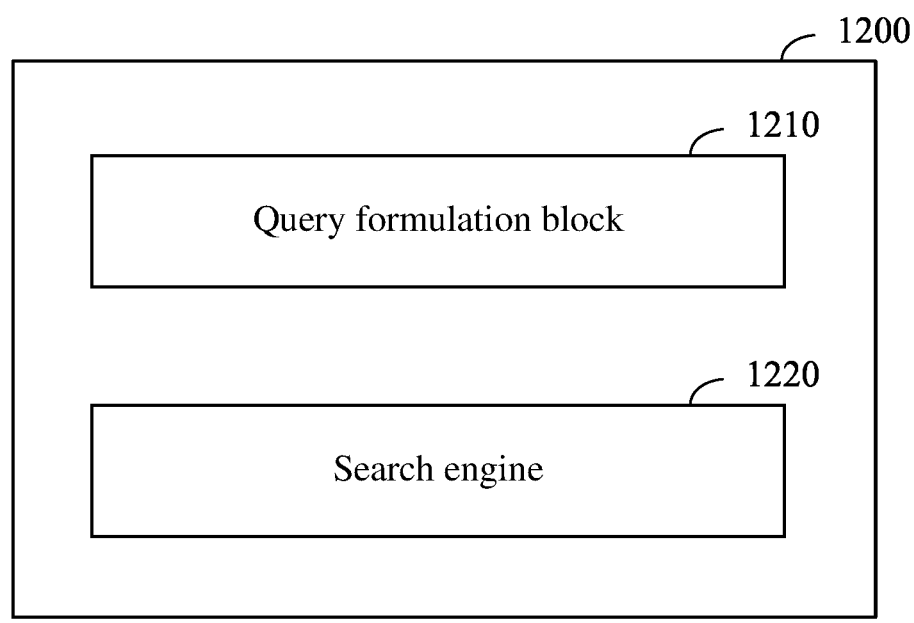
FIG. 12 illustrates an exemplary embodiment of a computing device according to the present disclosure.

FIG. 12 illustrates an exemplary embodiment of an apparatus 1200 according to the present disclosure. Note FIG. 12 is shown for illustrative purposes only, and is not meant to limit the scope of the present disclosure.

In FIG. 12, apparatus 1200 includes a query formulation block 1210 configured to receive workflow data generated by a user and formulate a query based on the received workflow data, the query comprising a query image. Apparatus 1200 further includes a search engine 1220 configured to retrieve a plurality of online results relevant to the formulated query and to rank the retrieved plurality of online results according to relevance to the formulated query. Apparatus 1200 is configured to serve at least one most highly ranked of the ranked plurality of results to the user.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A method for facilitating retrieval of online information during a project workflow, the method comprising:
   presenting a multi-dimensional image viewable at a first user perspective to a user through a head mounted display;
   identifying a portion of the multi-dimensional image that is viewable to the user from the first user perspective;
   detecting that a search trigger has been satisfied by the user zooming into the portion;
   in response to the detecting, automatically generating a search query related to the multi-dimensional image using as input to the search query generation:

(1) the portion of the multi-dimensional image that is viewable to the user in the first user perspective, and (2) one or more other images that the user has interacted with and that are different from the multi-dimensional image;

retrieving a plurality of online results relevant to the search query;

ranking the retrieved plurality of online results according to relevance to the submission query; and serving at least one highly ranked result from the plurality of online results to the user.

2. The method of claim 1, wherein the multi-dimensional image comprising a 2D perspective view of a 3D component.

3. The method of claim 1, further comprising:

detecting movement of the multi-dimensional image by the user to a second user perspective; and automatically generating another search query related to the multi-dimensional image based on a portion of the multi-dimensional image that is viewable to the user in the second user perspective.

4. The method of claim 1, further comprising:

identifying an angle of inclination or an azimuth angle associated with the first user perspective of the multi-dimensional image.

5. The method of claim 2, wherein the search query is further based on one or more parameters of a model associated with the multi-dimensional image.

6. The method of claim 1, wherein the search query is further based on user data associated with the user.

7. The method of claim 1, further comprising:

receiving a user request for information on the multi-dimensional image; and basing the search query, at least in part, on said user request.

8. The method of claim 1, wherein the ranking the plurality of online results comprising using an image matching machine learning module trained to calculate an image matching score based on a likelihood of match between the portion of the multi-dimensional and an image associated with one of the plurality of online results.

9. The method of claim 8, further comprising performing machine learning to calculate the image matching score based on perspective data a plurality of other search results.

10. A method for facilitating retrieval of online information during a user workflow, the method comprising:

receiving workflow data comprising a current user perspective of a multi-dimensional image being viewed by a user;

generating, without the user formulating a query or selecting a portion of the multi-dimensional image, an initial query based on both the current user perspective of the multi-dimensional image and one or more other images that the user has interacted with and that differ from the multi-dimensional image; and retrieving automatically, in response to a trigger signal comprising zooming into the portion of the multi-dimensional image an online result relevant to the query; and serving the online result to the user.

11. The method of claim 10, wherein the multi-dimensional image comprising a 2D perspective view of a 3D component.

12. The method of claim 11, wherein the workflow data comprising perspective data associated with the 2D perspective view.

13. The method of claim 12, wherein the perspective data comprising an angle of inclination or an azimuth angle associated with a viewing direction of the 2D perspective view relative to the 3D component.

14. The method of claim 11, wherein the workflow data comprising one or more parameters of a model associated with the 3D component.

15. The method of claim 10, wherein the workflow data comprising user data associated with the user.

16. The method of claim 10, wherein the query comprises at least some of the received workflow data.

17. A computing device for facilitating retrieval of online information by a user during a workflow, the device comprising a processor and a memory holding instructions executable by the processor to:

receive workflow data generated by a user;

generate an initial query based on the received workflow data, the initial query comprising a query image;

identify a perspective from which the user is viewing the query image;

generate a trigger signal based on both a portion of the query image that the user is viewing and one or more other images that the user has interacted with and that differ from the query image;

in response to the trigger signal and without user input, initiate formulation of a submission query comprising the portion of the query image that the user is viewing and the one or more other images that the user has interacted with and that differ from the query image;

retrieve a plurality of online results relevant to the submission query;

rank the retrieved plurality of online results according to relevance to the submission query; and serve at least one highly ranked result from the plurality of online results to the user.

18. The device of claim 17, wherein the query image comprising a 2D perspective view of a 3D component.

19. The device of claim 17, wherein the initial query further comprising an explicit query received form the user.

20. The device of claim 17, wherein the rank of the plurality of online results comprising using an image matching machine learning module trained to calculate an image matching score based on a likelihood of match between the query image and an image associated with one of the plurality of online results.

* * * * *